(12) United States Patent
Oh et al.

(10) Patent No.: US 9,001,933 B2
(45) Date of Patent: Apr. 7, 2015

(54) RECEIVING APPARATUS AND METHOD IN SMART UTILITY NETWORK COMMUNICATION SYSTEM

(71) Applicant: Electronics and Telecommunications Research Institute, Daejeon (KR)

(72) Inventors: Mi Kyung Oh, Daejeon (KR); Byoung Hak Kim, Daejeon (KR); Cheol-ho Shin, Daejeon (KR); Jaehwan Kim, Daejeon (KR); Sangsung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/945,520

(22) Filed: Jul. 18, 2013

(65) Prior Publication Data

US 2014/0023164 A1 Jan. 23, 2014

(30) Foreign Application Priority Data

Jul. 18, 2012 (KR) .................. 10-2012-0078353
Jun. 4, 2013 (KR) .................. 10-2013-0064280

(51) Int. Cl.
H03D 3/00 (2006.01)
H04L 27/14 (2006.01)
H04L 27/00 (2006.01)
H04L 27/16 (2006.01)

(52) U.S. Cl.
CPC ............ *H04L 27/14* (2013.01); *H04L 27/0014* (2013.01); *H04L 27/16* (2013.01)

(58) Field of Classification Search
USPC .................. 375/334, 268, 272, 303, 324, 335
See application file for complete search history.

(56) References Cited

U.S. PATENT DOCUMENTS

| | | | | |
|---|---|---|---|---|
| 2002/0121927 | A1* | 9/2002 | Op 'T Eynde et al. | 329/300 |
| 2002/0122509 | A1* | 9/2002 | Mueller et al. | 375/341 |
| 2010/0215135 | A1* | 8/2010 | Okada | 375/362 |

FOREIGN PATENT DOCUMENTS

| KR | 2003-0015638 | 2/2003 |
|---|---|---|
| KR | 10-2011-0096403 | 8/2011 |

OTHER PUBLICATIONS

Quinlan, Philip et al., "A Multimode 0.3-200-kb/s Transceiver for the 433/868/915-MHz Bands in 0.25-um CMOS," IEEE Journal of Solid-state Circuits, vol. 39(12):2297-2310 (2004).

* cited by examiner

*Primary Examiner* — Kabir A Timory
(74) *Attorney, Agent, or Firm* — Nelson Mullins Riley & Scarborough LLP (57) ABSTRACT

A receiving apparatus receives an FSK signal, converts the FSK signal into a phasor including amplitude and phase, estimates and compensates for a CFO (carrier frequency offset) from the converted phasor, and recovers a data bit from the converted phasor.

16 Claims, 13 Drawing Sheets

RECEIVING APPARATUS AND METHOD IN SMART UTILITY NETWORK COMMUNICATION SYSTEM

CROSS-REFERENCE TO RELATED APPLICATION

This application claims priority to and the benefit of Korean Patent Application No. 10-2012-0078353 and 10-2013-0064280 filed in the Korean Intellectual Property Office on Jul. 18, 2012 and Jun. 4, 2013, the entire contents of which are incorporated herein by reference.

BACKGROUND OF THE INVENTION (a) Field of the Invention

The present invention relates to an FSK (frequency shift keying) receiving apparatus and method in a smart utility network system, and more particularly, to a receiving apparatus and method based on FSK modulation.

(b) Description of the Related Art

Recently, much emphasis has been placed on the importance of AMI (advanced metering infrastructure) energy management systems, which improve energy consumption efficiency and provides a comfortable living environment by enabling two-way communication of real-time utility usage data for electricity, water, and gas between utility providers and consumers.

Up to now, active research has been conducted on telemetering systems for remotely measuring and monitoring utility usage from electricity, water, and gas meters, based on PLC and ZigBee technologies. However, ZigBee wireless technology has difficulty in obtaining a high link margin in a poor utility network communication environment, and there are limitations in merging ZigBee with mesh routing techniques in a remote outdoor environment. Accordingly, utility service providers in the U.S. established the IEEE 802.15.4g SUN (smart utility network) radio transmission technology standard, which is a new global standard linked to a smart grid.

A physical layer for the IEEE 802.15.4g SUN radio transmission technology standard utilizes narrow-band FSK modulation techniques, and such narrow-band FSK modulation techniques are optimized for smart-grid AMI systems because the communication distance is greater than 1 km owing to their narrowband characteristics.

However, FSK modulation systems vary in performance depending on the receiving method, and therefore the receiver sensitivity associated with the maximum communication distance may be low, and it may be difficult to extract information for channel scan, CCA (clear channel access), etc. used to run an AMI system in an IEEE 802.15.4g SUN standard-based network. This brings out the need for an FSK modulation method which is suitable for a SUN networking environment for a smart grid.

SUMMARY OF THE INVENTION

The present invention has been made in an effort to provide a receiving apparatus and method based on FSK (frequency shift keying) modulation, which achieves a wide communication range in a SUN (smart utility network) communication system, ensures reliable communication quality in a poor wireless channel environment, and provides information required to facilitate the operation of a SUN.

An exemplary embodiment of the present invention provides a method for receiving signals by an FSK receiver. The receiving method may include receiving an FSK signal; converting the FSK signal into a phasor including amplitude and phase, and recovering a data bit from the phasor.

The receiving method may further include, prior to the recovering, compensating for a CFO (carrier frequency offset).

The compensating may include estimating the CFO from the sum of phasors corresponding to predetermined parts of the FSK signal.

The predetermined parts may include a preamble part.

The predetermined parts may include an SFD (start of frame delimiter) part.

The FSK signal may include a preamble part and a payload part, and at least one of the preamble and payload parts may include a silence part. The recovering may include eliminating an interference signal from the FSK signal by using a phasor converted from the silence part.

The silence part of the preamble part may be inserted after a preamble signal.

The silence part of the payload part may be inserted at regular intervals.

The converting may include calculating the phasor by multiplying the FSK signal by a complex conjugate of the FSK signal obtained by delaying the FSK signal by a predetermined phase difference.

The converting may include calculating the phasor based on a difference between the FSK signal and a signal obtained by delaying the FSK signal by a phase difference.

The recovering may include determining the bit as 0 or 1 based on an imaginary amplitude of the phasor.

Another exemplary embodiment of the present invention provides an apparatus for receiving an FSK (frequency shift keying) signal. The receiving apparatus may include a phasor correlator for converting the FSK signal into a phasor including amplitude and phase, and a clock and data recoverer for recovering a data bit from the phasor.

The receiving apparatus may further include, prior to the recovering, a CFI compensator that estimates and compensates for the CFO by using the phasor.

The FSK signal may include a preamble signal, and the CFO compensator may estimate the CFO from the sum of phasors converted from the preamble signal.

The FSK signal may include an SFD (start of frame delimiter), and the CFO compensator may estimate the CFO from the sum of phasors converted from the SFD.

The FSK signal may include data, and the clock and data recoverer may determine a bit as 1 or 0 based on an imaginary amplitude of a phasor converted from the data.

The receiving apparatus may further include an interference signal eliminator that eliminates an interference signal from the FSK signal by using the phasor.

The FSK signal may include a silence part, and the interference signal eliminator may estimate an interference signal by using a phasor converted from the silence part.

The FSK signal may include a preamble part including a preamble signal and a payload part including data, and at least one of the preamble and payload parts may include a silence part.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Now, a receiving apparatus and method in a smart utility network communication system in accordance with an exemplary embodiment of the present invention will be described in detail.

A frequency band to operate a smart utility network (SUN) wireless device may be locally different, and the SUN wireless device is operated worldwide in a frequency band of 868-870 MHz, 902-928 MHz, and 2400-2483.5 MHz, for example. In the Republic of Korea, 917 to 923.5 MHz bands that can radiate transmission power of a maximum of 10 dBm are used as an operation frequency for the SUN wireless device.

The 900 MHz band has better propagation characteristics than the 2.4 GHz ISM band and thus has an advantage in securing communication distance; however, in the republic of Korea, it would be difficult to secure communication distance because the transmission power is limited to a maximum of 10 dBm in the 900 MHz band. The required minimum receiver sensitivity defined in the IEEE 802.15.4g SUN standard is −91 dBm at a data rate of 50 Kbps. For a 200 KHz bandwidth, the Rx noise level is −121 dBm, which gives a margin of 30 dB above the receiver sensitivity. With this margin of 30 dB, an SNR (signal to noise ratio) must meet a frequency tolerance specification of ±30 ppm and a BER (bit error rate) of $10^{-5}$ to comply with the standard.

Taking a noise figure (NF) and a realized loss of 15 dB or more into account to realize a low-power receiver, it can be seen that a BER of $10^{-5}$ is required at an SNR of 15 dB or less.

Figure 2:
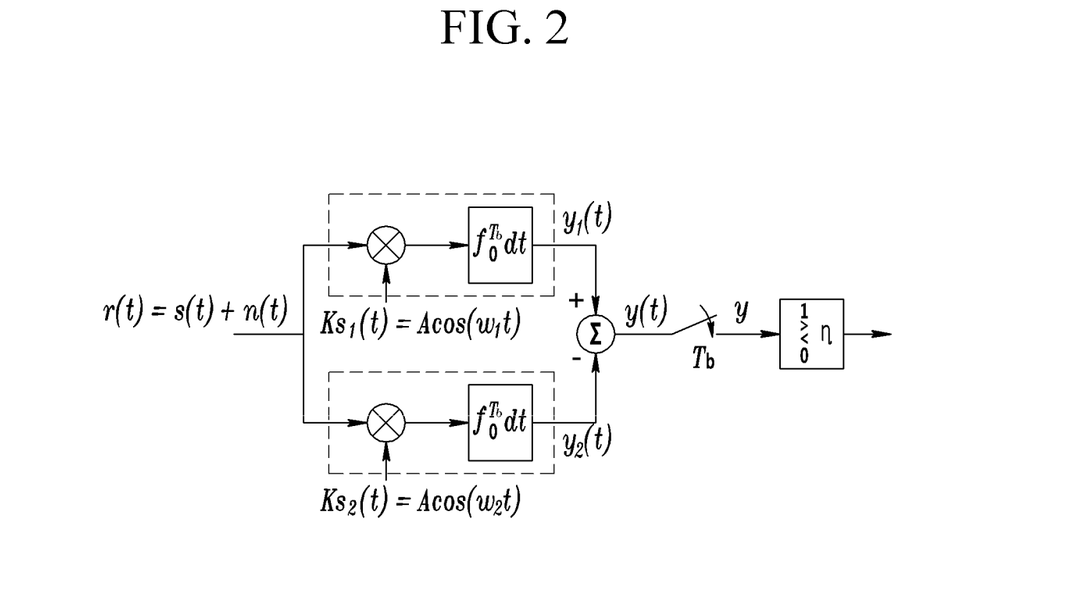
FIG. 2 is a conceptual view showing an ideal FSK non-coherent receiver.

However, an FSK transmission/reception system having the advantage of low power has poorer performance than PSK and OFDM schemes, so it requires a higher SNR. For an ideal FSK modulator, if there is no carrier frequency offset (CFO) and clock & data recoverer (CDR) is completed, the SNR required to meet the BER of $10^{-5}$ is 13 dB, as shown in FIG. 2. Accordingly, an FSK receiver needs to be designed to deliver performance as close to that of an ideal FSK transmitter as possible even when there are several degradation factors.

In order to properly operate a network based on the IEEE 802.15.4g SUN standard, a receiver ED (energy detection) value to be used for channel scanning to select a network channel, an LQI (link quality indicator) value for checking the link quality using the currently received packet, a CCA (clear channel access) function for facilitating communication between a large number of SUN wireless devices in a single network, and so on are required. It is necessary to employ an FSK reception structure for extracting the above-mentioned values to use it as a SUN system for a smart grid.

An FSK transmission/reception system is a typical narrow-band physical layer, and has a merit that a high-linearity power amplifier having large power consumption may not be used and a configuration of a non-coherent receiver of low power and low complexity that may not track a carrier phase can be formed. Particularly, as the performance difference between an optimal coherent receiver and a non-coherent receiver is about 1 dB, there is a merit that a low-power receiver in which a degradation level of performance is not large can be configured. However, generally, because the FSK transmission/reception system has low performance compared with a BPSK system, the receiver has to be configured effectively in order to supplement such a drawback.

Figure 1:
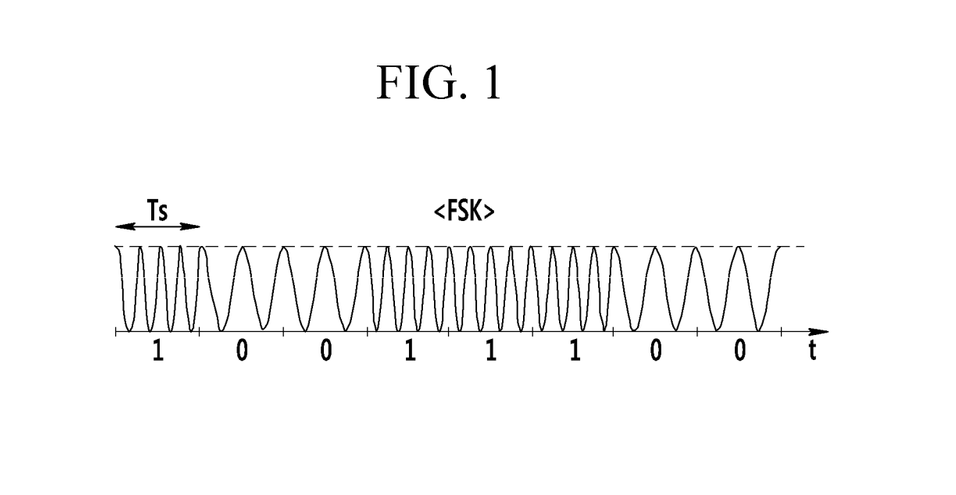
FIG. 1 is a conceptual view showing an FSK modulation technique applied to an exemplary embodiment of the present invention.

FIG. 1 is a conceptual view showing an FSK modulation technique applied to an exemplary embodiment of the present invention.

As shown in FIG. 1, FSK modulation is a method of allocating bits 0 and 1 of a digital signal to different frequencies and transmitting them. An FSK modulation signal may be represented as shown in Equation 1.

$$s_k^{FSK}(t) = \sqrt{\frac{2E_b}{T_s}}\, p(t - KT_s) \cdot \cos[2\pi(f_c + b_k \Delta f)t] \quad \text{(Equation 1)}$$

Herein, p(t) is a rectangular pulse of a width $T_s$ corresponding to one bit, Eb is energy per bit, fc is a carrier frequency, and $\Delta f$ is frequency deviation. bk is an input data bit corresponding to 0 or 1.

As such, FSK modulation is a method of transmitting bit 0 at a lower frequency than the carrier frequency and bit 1 at a higher frequency than the carrier frequency. FIG. 2 illustrates a method of ideally demodulating an FSK modulation signal by a receiving apparatus, and FIG. 3 illustrates the BER performance.

Figure 3:
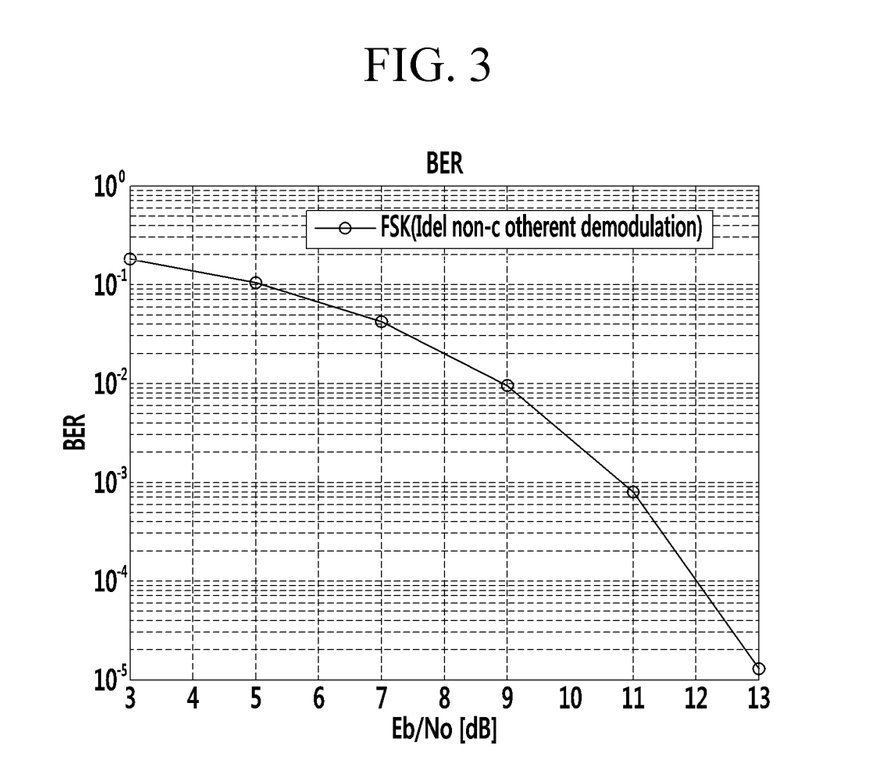
FIG. 3 is a graph showing the BER performance of the ideal FSK non-coherent receiver.

FIG. 2 is a conceptual view showing an ideal FSK non-coherent receiver, and FIG. 3 is a graph showing the BER performance of the ideal FSK non-coherent receiver.

As shown in FIG. 2, the ideal FSK non-coherent receiver restores a received signal r(t) by multiplying the received signal r(t) by the same carrier (A cos $w_1$t and A cos $w_2$t) as the carrier used for transmission. The received signal r(t) may be defined by the sum of an FSK signal s(t) modulated by the transmitter, and noise n(t). The FSK signal s(t) may be represented by Equation 2. $S_1$ $$s(t) = \begin{cases} s_1(t) = A\cos(2\pi f_1 t) \\ s_2(t) = A\cos(2\pi f_2 t) \end{cases} \quad \text{(Equation 2)}$$

When the FSK signal s(t) is as shown in Equation 2, an output signal y(t) of the ideal FSK non-coherent receiver may be represented by Equation 3.

$$Y(t) = T_s/2 - 0 \quad \text{(Equation 3)}$$
$$= T_s/2, \text{ [if, } S_1(t)]$$
$$= 0 - T_s/2$$
$$= -T_s/2, \text{ [if, } S_2(t)]$$

The ideal FSK non-coherent receiver determines a bit as 0 when y(t) is $T_b/2$ and 1 when y(t) is $-T_b/2$.

When a received FSK signal is demodulated in such a manner as in FIG. 2, it can be seen that an SNR of 13 dB is required to meet the BER performance of $10^{-5}$.

Figure 4:
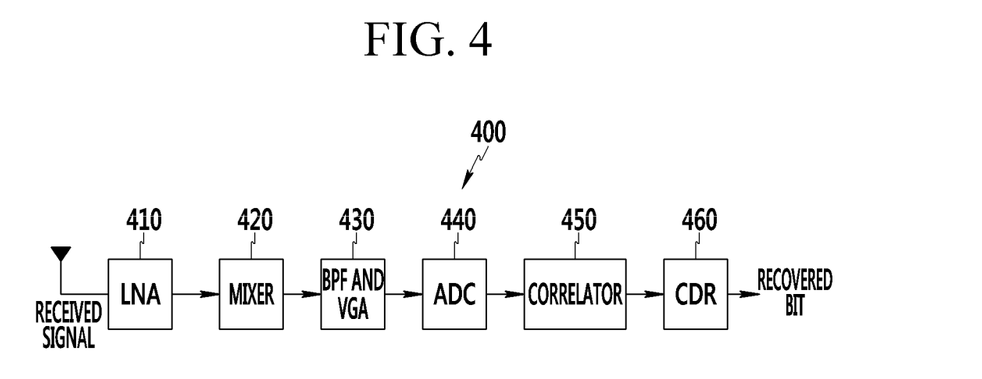
FIG. 4 illustrates an example of an FSK receiver, which is an actual implementation of the ideal FSK non-coherent receiver of FIG. 2.

FIG. 4 illustrates an example of an FSK receiver for actual implementation of the FSK non-coherent receiver.

Figure 5:
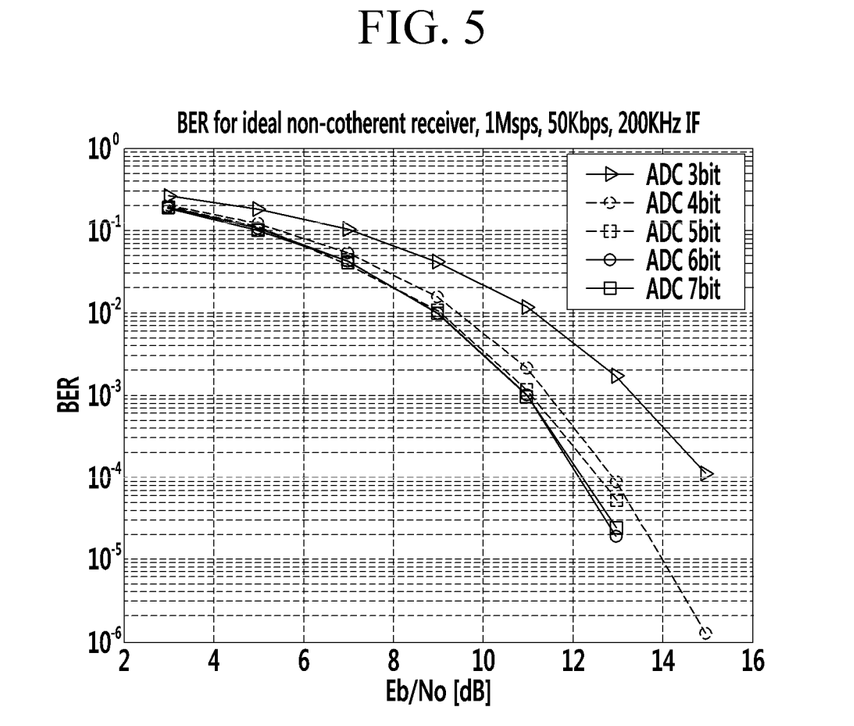
FIG. 5 is a graph showing the performance of the ideal FSK non-coherent receiver versus the bit resolution of an ADC.
Figure 6:
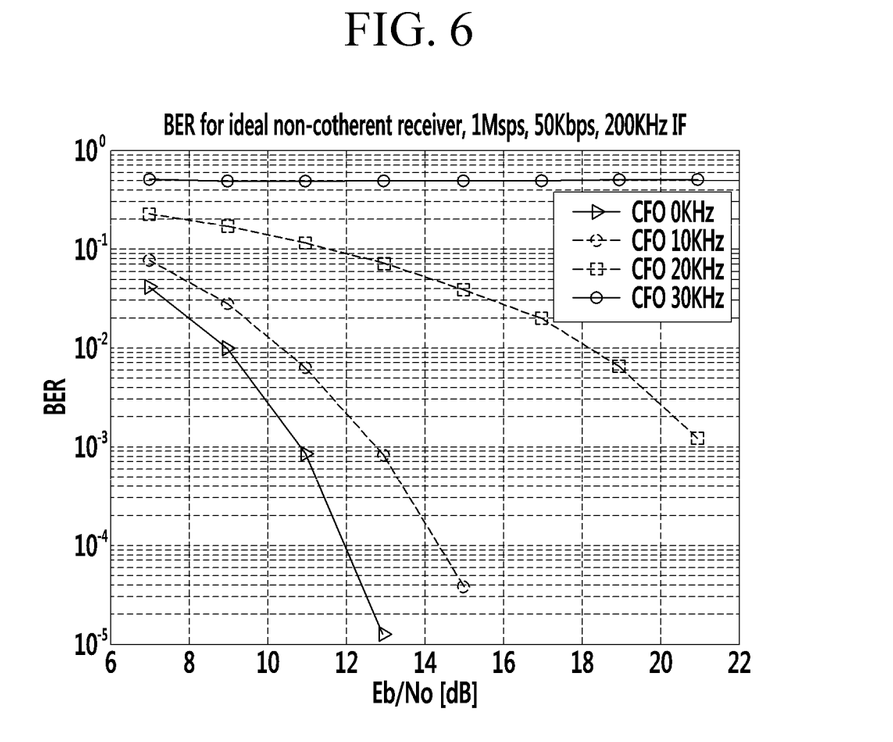
FIG. 6 is a graph showing the performance of the ideal FSK non-coherent receiver versus CFO.

FIG. 4 is a view showing an example of an FSK receiver, which is an actual implementation of the ideal FSK non-coherent receiver of FIG. 2. FIG. 5 is a graph showing the performance of the ideal FSK non-coherent receiver versus the bit resolution of an ADC. FIG. 6 is a graph showing the performance of the ideal FSK non-coherent receiver versus CFO.

As shown in FIG. 4, an FSK receiver 400 includes a low-noise amplifier (LNA) 410, a mixer 420, a bandpass filter (BPF) and variable gain amplifier (VGA) 430, an analog-to-digital converter (ADC) 440, a correlator 450, and a clock & data recoverer (CDR) 460.

A received FSK signal is low-noise amplified as it passes through the LNA 410, and the low-noise amplified signal is converted into a baseband signal by the mixer 420. The baseband signal is adjusted to have a predetermined bandwidth and amplitude as it passes through the BPF and VGA 430, and is converted into a digital signal by the ADC 440. The correlator 450 obtains a correlation value by digitally correlating a digital signal with the same carrier signal as the one used at the time of transmission. When the obtained correlation value passes through the CDR 460, bits are determined as 0 or 1 according to the correlation value.

The FSK receiver 400 uses digital correlation for bit recovery and hence requires the ADC 430. As shown in FIG. 5, if the bit resolution of the ADC 430 is about 4 bits, the BER of $10^{-5}$ can be achieved at 14 dB (realized loss of 1 dB). However, such an FSK receiver 400 based on the correlator 440 requires accurate timing information.

As shown in FIG. 6, it can be seen that the performance degradation of the FSK non-coherent receiver becomes significant as the CFO value increases. The CFO is a performance degradation factor which is inevitably generated due to mismatch between oscillators of the transmitter and the receiver. Reducing the performance degradation requires the use of expensive oscillators, and the complexity of the correlator 440 itself acts as a barrier to the implementation of low-power/low-cost SUN systems. Accordingly, the FSK receiver 700 shown in FIG. 7 is more commonly used than the FSK receiver 400 shown in FIG. 4.

Figure 7:
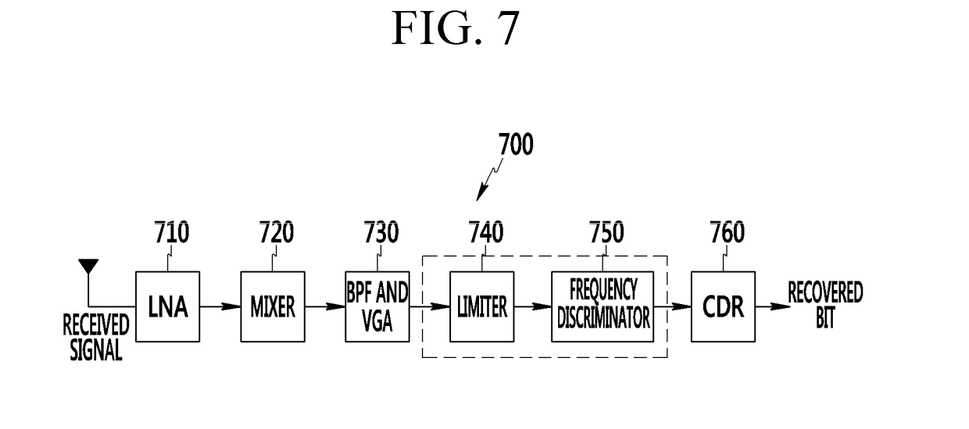
FIG. 7 is a view showing another example of the FSK receiver.

FIG. 7 is a view showing another example of the FSK receiver.

As shown in FIG. 7, a limiter 740 amplifies an output signal of a BPF and VGA 730 to the maximum level and then limits it, and a frequency discriminator 750 demodulates signals by using the limited signal. This method has the merit of a simple FSK receiver 700.

A typical example of choosing the FSK receiver 700 of FIG. 7 includes a CFC (complex frequency correlator) scheme introduced by Analog Devices Inc. The structure and operation of the CFC is as shown in FIG. 8.

Figure 8:
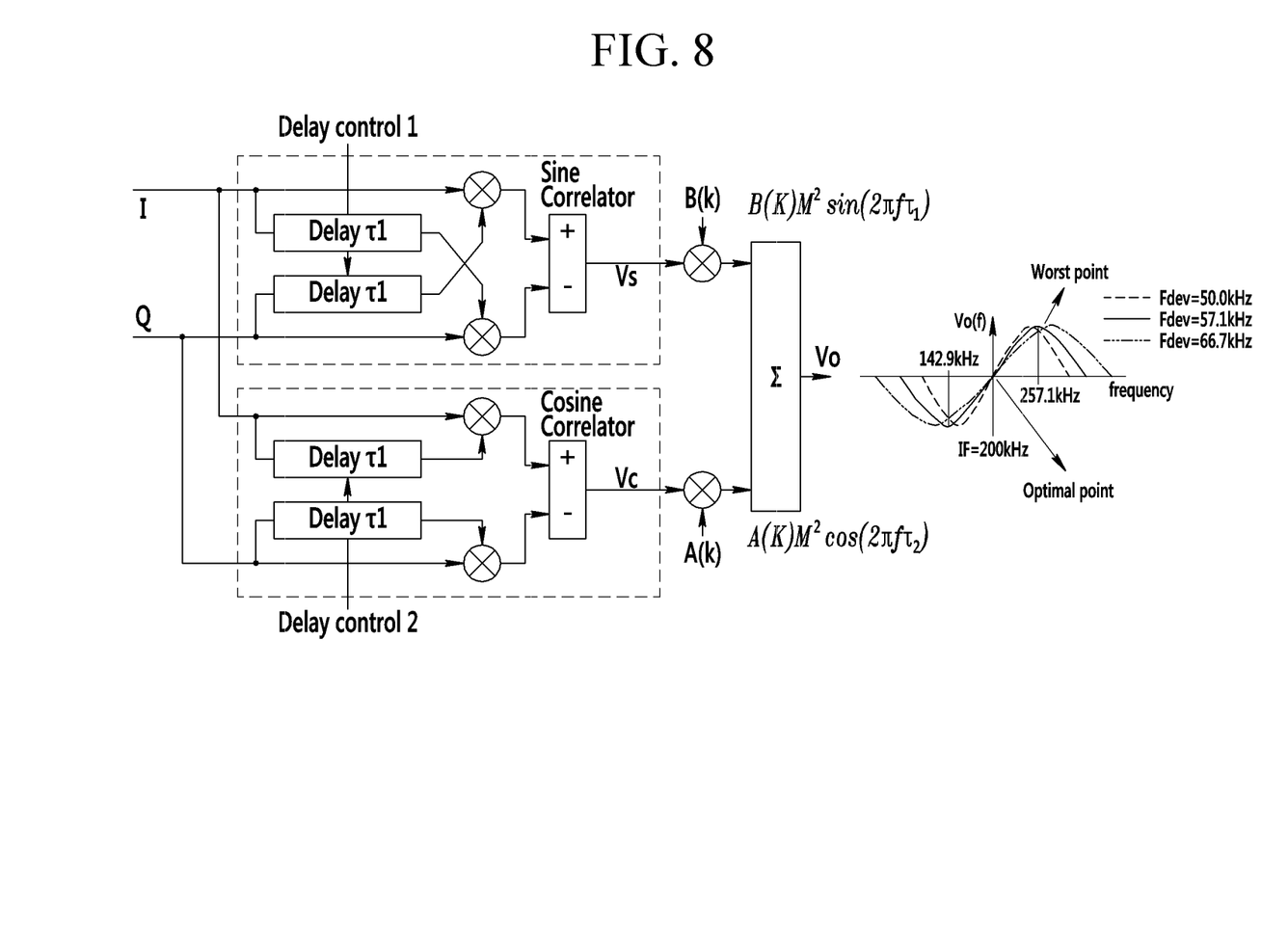
FIG. 8 is a view showing the structure and operating principle of the CFC.

FIG. 8 is a view showing the structure and operating principle of the CFC.

As shown in FIG. 8, the CFC scheme is a method in which the sum of output values Vs and Vc of a sine correlator and a cosine correlator is output from limited I and Q signals, and the output value Vo of the CFC is divided into frequencies of bit 0 and bit 1 at the optimal point.

Figure 9:
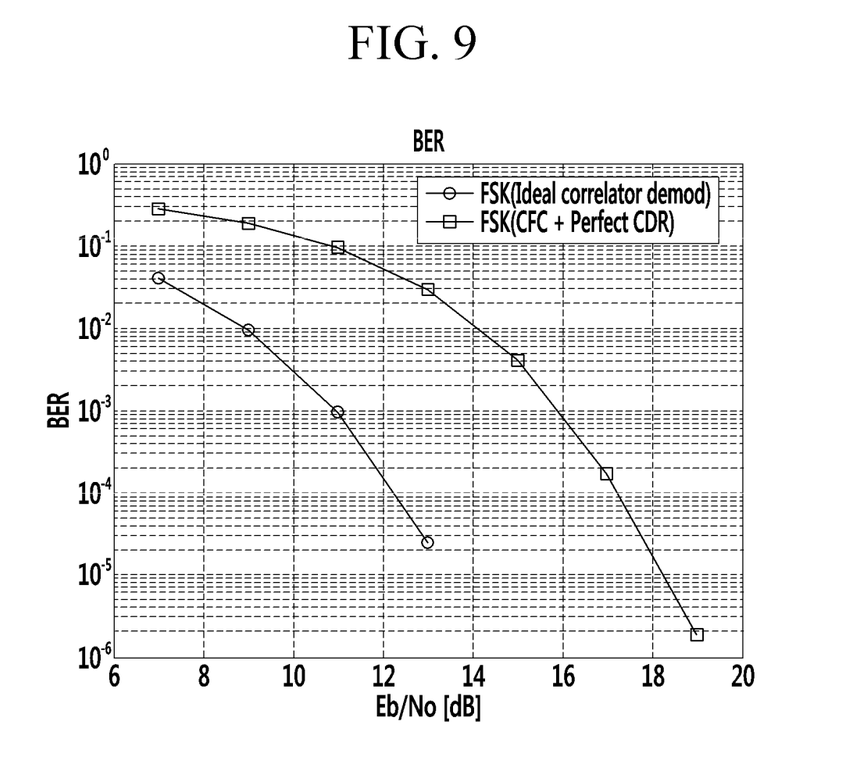
FIG. 9 is a graph comparing the performance of the CFC scheme and the performance of the ideal FSK non-coherent receiver.
Figure 10:
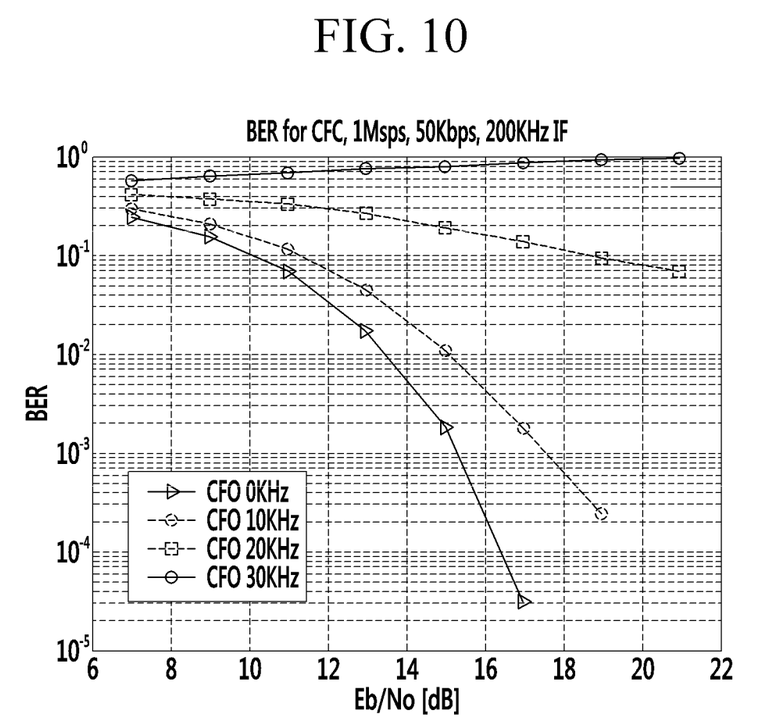
FIG. 10 is a graph showing the BER performance of the CFC scheme using CFO.

FIG. 9 is a graph comparing the performance of the CFC scheme and the performance of the ideal FSK non-coherent receiver, and FIG. 10 is a graph showing the BER performance of the CFC scheme using a CFO.

As shown in FIG. 9, it can be seen that the CFC scheme requires an SNR of 18 dB or more to meet the BER of $10^{-5}$. It is found that there is a difference in performance of 5 dB between the CFC scheme and the ideal FSK non-coherent receiver of FIG. 2. The reason why the FSK receiver is used regardless of such performance degradation is because the FSK receiver can be implemented with low power, rather than being ideal. However, as shown in FIG. 10, the structure of the CFC also has the problem of performance degradation because it is sensitive to CFO.

Referring to FIG. 10, a small CFO can be compensated for by DC offset estimation; however, if the CFO exceeds a certain level, the output value Vo of the CFC moves to the worst point as shown in FIG. 8, and hence bit inversion occurs. Once this phenomenon occurs, the BER has a value of 0.5 and received signals cannot be restored at all.

Moreover, the use of ADC for this CFC scheme is limited, and this makes it difficult to provide receiver ED (energy detection) and LQI (link quality indication) and apply the CCA method or the like. In addition, the CFC scheme has the drawback that the VGA should always have a maximum gain regardless of the communication distance between the transmitter and the receiver in order to limit signals, thereby causing unnecessary power consumption.

Consequently, an exemplary embodiment of the present invention proposes a new FSK receiver capable of complementing the ideal FSK receiver structure and the CFC structure.

The FSK receiver in accordance with the exemplary embodiment of the present invention detects a frequency difference by phase measurement in a complex domain. To this end, a phasor correlator is used.

Figure 11:
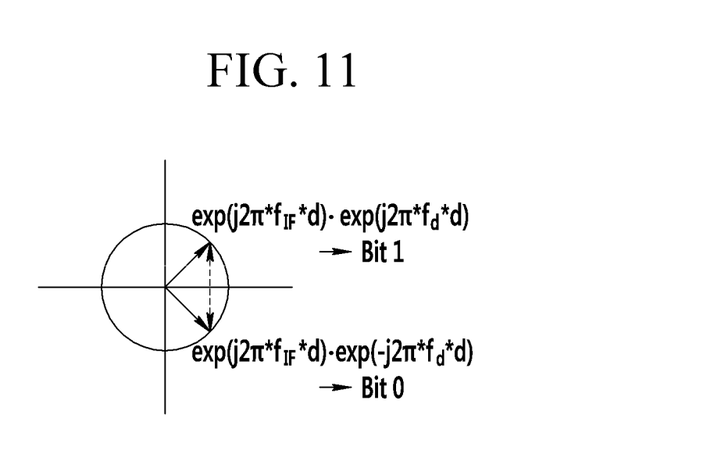
FIG. 11 is a conceptual view showing the output from a phasor correlator in accordance with an exemplary embodiment of the present invention.
Figure 12:
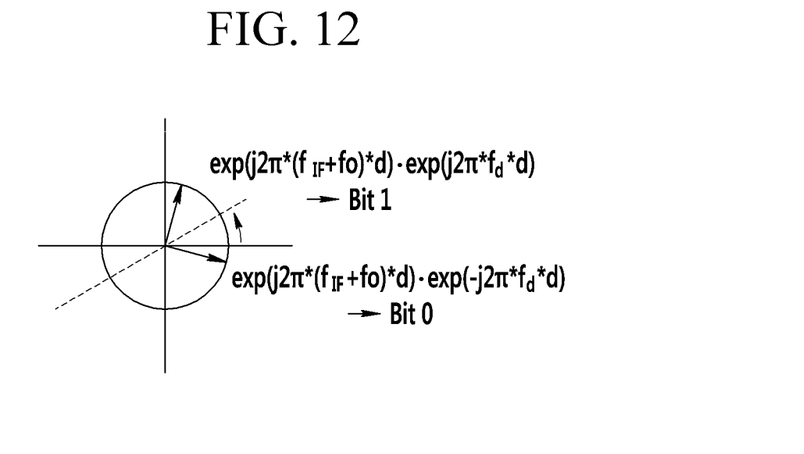
FIG. 12 is a view showing another example of the output from the phasor correlator in accordance with the exemplary embodiment of the present invention.

FIG. 11 is a conceptual view showing the output from a phasor correlator in accordance with an exemplary embodiment of the present invention, and FIG. 12 is a view showing another example of the output from the phasor correlator in accordance with the exemplary embodiment of the present invention.

A received FSK signal may be represented by Equation 4, taking the intermediate frequency (IF) $f_{IF}$ and the frequency deviation $f_d$.

$$r(t)=\exp(j2\pi*f*t)$$

$$\text{bit 1}: f=f_{IF}+f_d$$

$$\text{bit 0}: f=f_{IF}-f_d \quad \text{(Equation 4)}$$

The phasor correlator converts a received FSK signal r(t) into a phasor by using a received FSK signal r(t−d), which is delayed from the received FSK signal r(t) by a phase difference d. The phasor represents a vector including amplitude and phase in polar coordinates. That is, when the received FSK signal r(t) has passed through the phasor correlator, an output signal from the phasor correlator can be represented by Equation 5.

$$s(t) \cdot s^*(t-d) = \exp(j2\pi*f*d) \quad \text{(Equation 5)}$$

By substituting frequencies corresponding to bits 0 and 1 into f of Equation 5, two phasors are obtained as shown in FIG. 11, and a frequency difference can be detected from these phasors. In this Equation, $f_{IF}$ and d are fixed values, and therefore exp (j2 $\pi*f_{IF}*$d) is a constant complex. The delay d corresponding to the phase difference is set to make the two phasors of FIG. 11 as far away as possible from each other, and may be set as shown in Equation 6.

$$d = \text{MAX}\{\exp(j2\pi*f*d)|_{f=f_{IF}+f_d} - \exp(j2\pi*f*d)|_{f=f_{IF}-f_d}\} \quad \text{(Equation 6)}$$

From Equation 6, d is equal to $1/(4*f_d)$.

If no CFO exists as shown in FIG. 11, a data bit can be easily determined as 1 or 0, based on the imaginary amplitude of a phasor.

On the other hand, if CFO $f_o$ exists, Equation 5 can be modified into Equation 7.

$$s(t) \cdot s^*(t-d) = \exp(j2\pi*(f+f_o)*d) \quad \text{(Equation 7)}$$

That is, the phasors corresponding to bits 0 and 1 are rotated according to $f_o$ as shown in FIG. 12

The addition of the vectors of the two phasors equals the amount of rotation, which corresponds to an estimated CFO value. Accordingly, an accurate CFO can be estimated simply by adding outputs of the phasor correlator, and bits can be determined as 1 or 0 after compensating the CFO with this estimated CFO value. The CFO estimation may be applied immediately after obtaining a phasor or after passing through an LPF (low pass filter).

Figure 13:
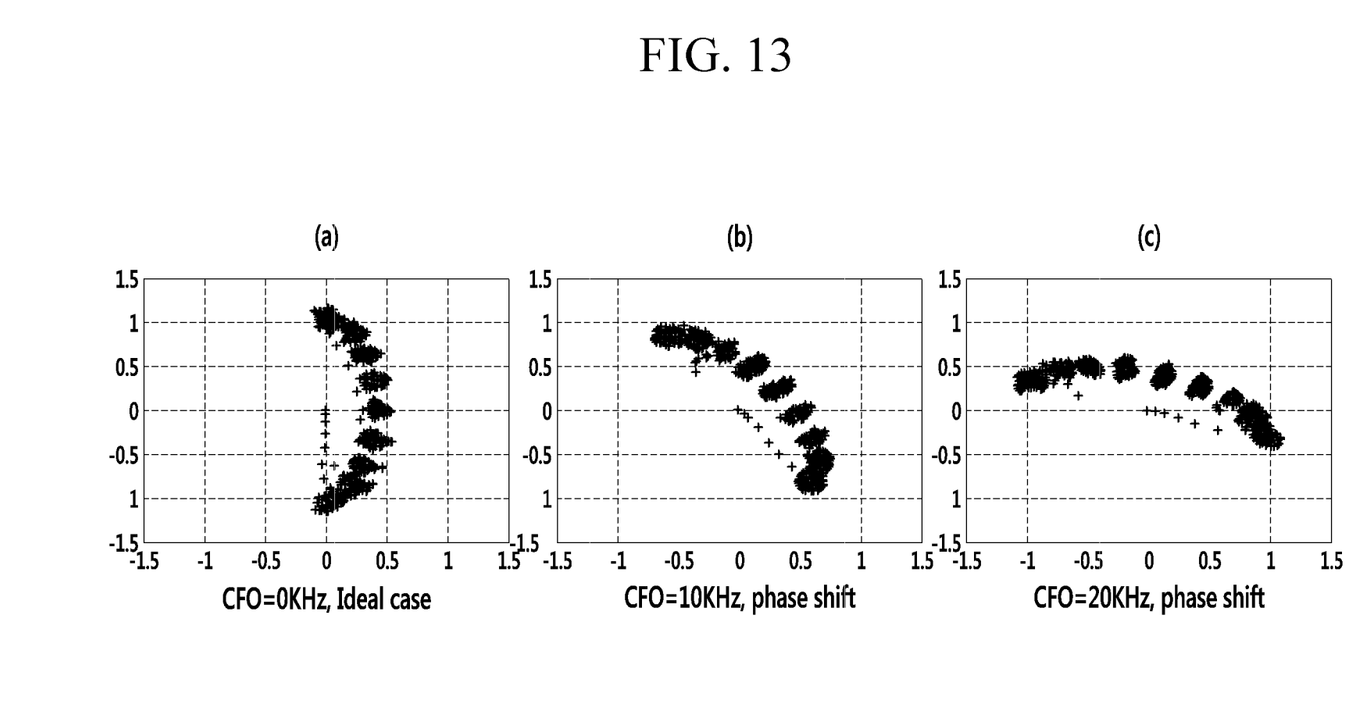
FIG. 13 illustrates an example of rotation of phasors according to CFO.

FIG. 13 illustrates an example of rotation of phasors according to CFO.

FIG. 13 is a view showing the rotation of phasors according to CFO.

Referring to FIG. 13, it can be seen that the phasors of (b) and (c) with CFO are rotated further than the phasor of (a) with no CFO, and it can be seen from the phasors of (b) and (c) with CFOs of 10 KHz and 20 KHz, respectively, that the higher the CFO, the further the phasors are rotated. In this case, each CFO can be estimated from the sum of the phasors of (b) and (c).

Figure 14:
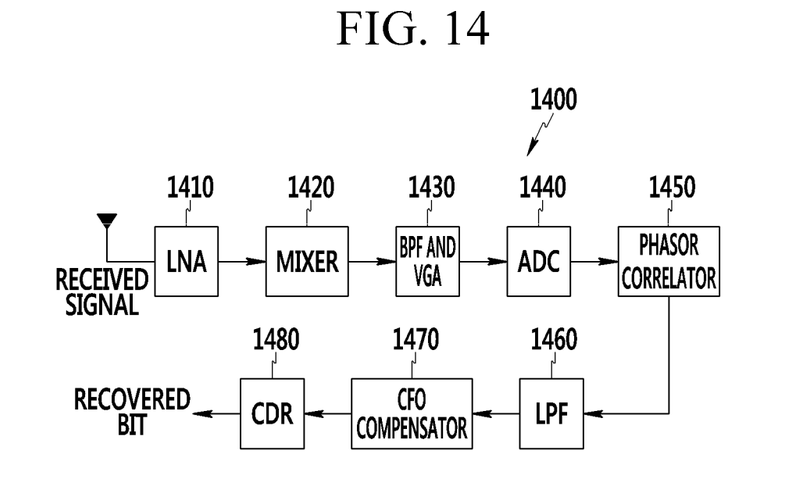
FIG. 14 is a view showing an FSK receiver in accordance with an exemplary embodiment of the present invention.

The FSK receiver using the above-described phasor correlator can be configured as shown in FIG. 14.

Figure 15:
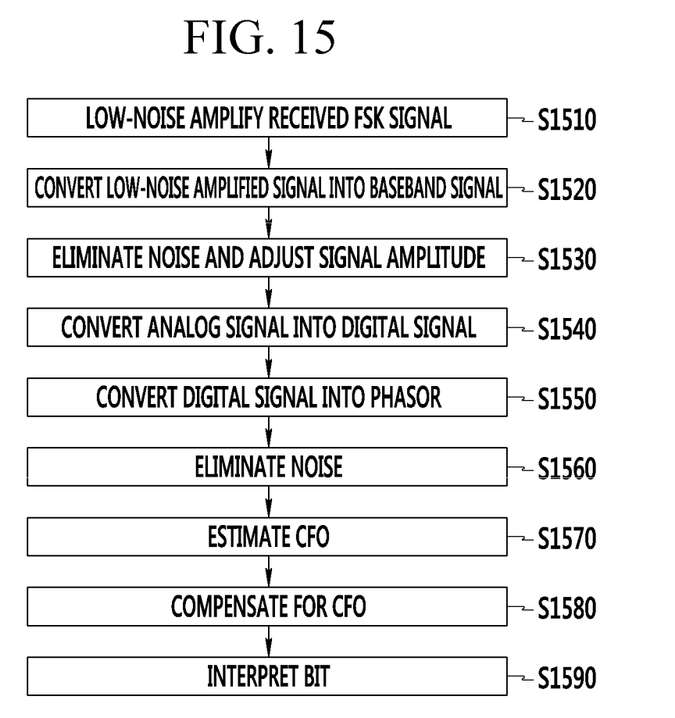
FIG. 15 is a flowchart showing a method for bit recovery in the FSK receiver in accordance with the exemplary embodiment of the present invention.

FIG. 14 is a view showing an FSK receiver in accordance with an exemplary embodiment of the present invention, and FIG. 15 is a flowchart showing a method for bit recovery in the FSK receiver in accordance with the exemplary embodiment of the present invention.

Referring to FIG. 14, the FSK receiver 1400 includes an LNA 1410, a mixer 1420, a BPF and VGA 1430, an ADC 1440, a phasor correlator 1450, a low-pass filter (LPF) 1460, a CFO compensator 1470, and a CDR 1480. Referring to FIG. 15, a low-noise amplifier 1410 low-noise amplifies a received FSK signal (S1510).

The mixer 1420 converts the low-noise amplified FSK signal into a baseband signal (S1520).

The BPF and VGA 1130 eliminates noise or interference from the baseband signal, and adjusts the signal to have a predetermined amplitude (S1530).

The ADC 1440 converts an analog signal output from the BPF and VGA 1430 into a digital signal (S1540).

The phasor correlator 1450 converts the digital signal into a phasor, as shown in Equation 5 (S1550).

The phasor correlator 1450 is able to convert a digital signal into a phasor by multiplying the input digital signal by a complex conjugate of the digital signal obtained by delaying the digital signal in the time domain.

The low-pass filter 1460 eliminates noise from the digital signal (S1560).

The CFO compensator 1470 estimates the CFO from the sum of phasors converted from the preamble of the received FSK signal (S1570), and compensates for the estimated CFO (S1580).

After CFO compensation, the CDR 1480 recovers a bit as 1 or 0 based on the imaginary amplitude of a phasor after CFO compensation (S1590).

Figure 16:
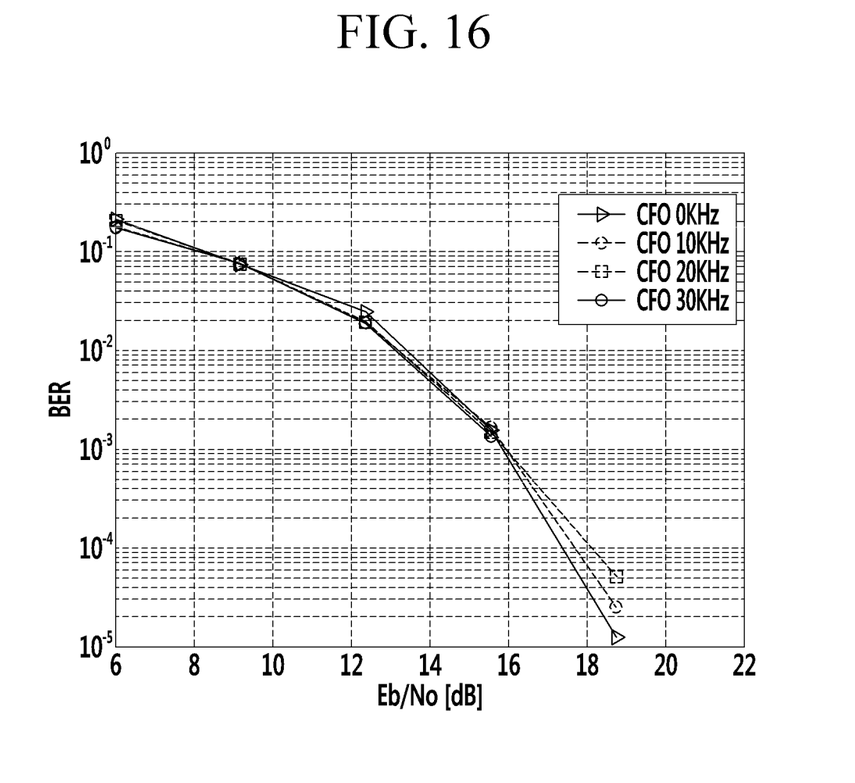
FIG. 16 is a graph showing the BER performance of the FSK receiver of FIG. 14.

FIG. 16 is a graph showing the BER performance of the FSK receiver of FIG. 14.

As shown in FIG. 16, the FSK receiver 1400 in accordance with the exemplary embodiment of the present invention requires an SNR of 25 dB to meet the BER of $10^{-5}$. This SNR is higher by 3 dB than that of the CFO scheme, there is a difference of 2 dB in performance with the ideal FSK receiver, and most importantly performance degradation with a CFO value rarely occurs.

Moreover, the FSK receiver 1400 can calculate the receiver ED and LQI with the use of the ADC 1440, and use an AGC (automatic gain control) algorithm to control gains of the LNA 1410, the mixer 1420, and the VGA 1430 at the RF front-end according to the amplitude of a received signal, thereby reducing the power consumption of the RF front-end.

A variety of operations of the FSK receiver 1400 can be implemented by means of the phasor correlator 1450.

Regarding the CFO estimation, it is difficult to obtain a stable estimated value for a random bit due to the uncertainty of the sum of phasors. To avoid this, the CFO compensator 1470 performs CFO estimation and compensation only on a bit pattern for which the sum of phasors is known, and does not perform CFO estimation and compensation on the subsequent bits.

Figure 17:
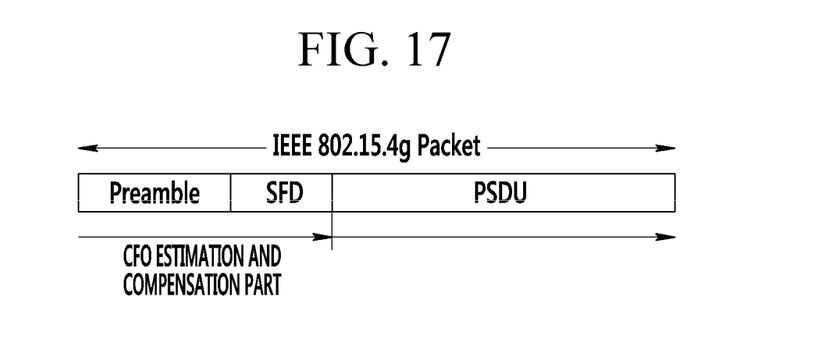
FIG. 17 and FIG. 18 are views showing an example of a received packet in accordance with an exemplary embodiment of the present invention, which represents a packet structure complying with the IEEE 802.15.4g standard.
Figure 18:
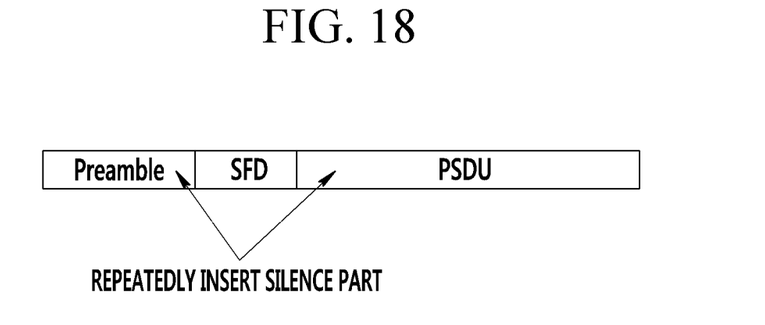

FIG. 17 and FIG. 18 are views showing an example of a received packet in accordance with an exemplary embodiment of the present invention, which represents a packet structure complying with the IEEE 802.15.4g standard.

As shown in FIG. 17, a received packet includes a preamble field, an SFD (start of frame delimiter) field, and a payload. The preamble field includes a preamble signal, and the SFD field includes an SFD indicating the start of a frame. The payload includes a PSDU (PHY service data unit) which is actual data.

In this case, the start point of a frame is detected by the SFD, and then data demodulation starts. In this case, the CFO compensator 1470 uses only the signal in the preamble or SFD part as the phasor for CFO estimation. That is, the preamble part and/or SFD part may be used as a CFO estimation and compensation part.

Since the bit pattern of the preamble or SFD part is known, the CFO is estimated using only the signal in the preamble or SFD part, and then the subsequent bit symbols are compensated using the previously estimated CFO. That is, because an estimated CFO value for a random bit may not be stable, only the preamble or SFD part is used to provide a stable estimated CFO value.

In a poor channel environment or a channel-changing environment, the FSK transmitter may change the signal structure in order to detect a change in CFO value or phase and apply this change to a packet. For example, if the channel is in a bad condition, the FSK transmitter may spread out bit symbols when transmitting the bit symbols. In this case, a particular alternating pattern of "0"s and "1"s (in particular, a 01 or 10 pattern having a certain length) is used. Based on this alternating pattern, phasors can be used for CFO estimation.

Other than spreading out the bit symbols, the FSK transmitter may insert a predetermined pattern through a predetermined bit interleaving pattern, in order to help in updating phasors. For example, $N_p$ patterns of alternating 0s and 1s may be inserted every $N_b$ data bits. In this case, even if a bit error exists in $N_b$ data bits, the CFO may be compensated for based on $N_p$ patterns, like a pilot, thereby making bit reception easy. This structure may be optionally used when a packet is long. That is, although there is little change in parameters for short packets, there is a possibility of communication environment change for long packets.

While a phasor in accordance with an exemplary embodiment of the present invention may be obtained by multiplying of complex conjugates, as shown in Equation 5, the phasor correlator 1450 may obtain the phasor simply by s(t)−s(t−d) in order to reduce the amount of calculation. This has the advantage of lower complexity because subtraction, instead of addition, is used.

The FSK receiver 1400 in accordance with the exemplary embodiment of the present invention also may be utilized in PSK and OFDM. For PSK, a pulse shaping filter is usually used between modulation symbols to avoid an abrupt phase shift. Using this pulse shaping filter, phase transition appears between symbols, by which the above-explained bit determination or CFO estimation technique may be used.

For OFDM, the phasor correlator 1450 (CFO estimation technique) may be used to subcarriers for data bit transmission, or to pilot subcarriers. For, the phasor correlator 1450 may be used to subcarriers for data bit, the data is transmitted by phase change based on symbol values as a unit of data subcarriers.

In this case, the data symbols are phase-rotated by a synchronization shift in the time domain. Using the phasor correlator 1450 in accordance with the exemplary embodiment of the present invention, a phase shift between subcarriers can be estimated, and a synchronization error in the time domain can be estimated and compensated for based on the estimated phase shift.

In typical OFDM symbol demodulation, data symbols are demodulated by estimating the channel response in the frequency domain from pilot or reference symbols. Thus, there is no problem in demodulating data symbols even if a synchronization error is generated in the time domain. However, information about the accurate synchronizing timing of OFDM symbols is critical to estimate the propagation distance of the transmitter and the receiver, and is also essential to maximize the performance of OFDM based on CoMP, which is a multiplexing transmission/reception system. By applying the phasor correlator 1450 in accordance with the exemplary embodiment of the present invention to a pilot signal to perform effective estimation, a synchronization error can be estimated quite accurately. To this end, it is preferred that a constant-size sequence, such as a predetermined single-tone or a CAZAC (constant amplitude zero autocorrelation) sequence, is used for a pilot signa in the frequency domain. Once a pilot signal is generated based on this pilot signal and carried on a pilot subcarrier, the pilot signal passes through the phasor correlator in the frequency domain. Thus, a synchronization signal can be estimated based on a phase deviating from the reference phasor that originally needs to be estimated.

Moreover, the advantage of using a single tone for the pilot part of an
OFDM symbol is that the effect of pilots of different OFDM symbols can be eliminated in a multiuser environment (mobile communication or MU-MIMO environment) where multiple OFDM symbols are used. Furthermore, only the pilots of a particular OFDM symbol can be filtered out, and therefore information on timing errors can be attained.

In addition, the phasor correlator 1450 may be utilized to estimate and eliminate co-channel interference and jamming signals. In estimating such interference signals, the characteristics of jamming signals such as single tones and interference signals of electronic equipment are not changed for a long time. Such interference signals are estimated as a way to solve this problem. Using the structure of the phasor correlator 1450, the interference signals can be easily estimated. As an example, assuming that the signal structure of a transmitter is not configured to estimate interference signals, if the phase correlator 1450 is operated first before the FSK receiver 1400 receives a packet, a predetermined phasor is generated due to an interference signal during the operation of the phase correlator 1450. It is possible to estimate and eliminate the interference signal component from the received signal.

Nevertheless, unless the transmitter is configured to estimate interference signals, it is not always guaranteed that the interference signals will be eliminated properly. Accordingly, a transmission signal needs to be configured to have silence parts (i.e., parts in which no signal is sent) on an intermittent basis, so as to estimate interference signals. For example, as shown in FIG. 18, the transmitter may be configured to insert a silence part after a predetermined preamble signal in the preamble part or repeatedly transmit a preamble and a silence part. Moreover, to eliminate an interference signal with a time-varying characteristic, the transmitter may insert a predetermined silence part into the payload part as well as into the preamble. In this case, the transmitter may insert a silence part in a pattern with regular intervals or in a predetermined time pattern.

Figure 19:
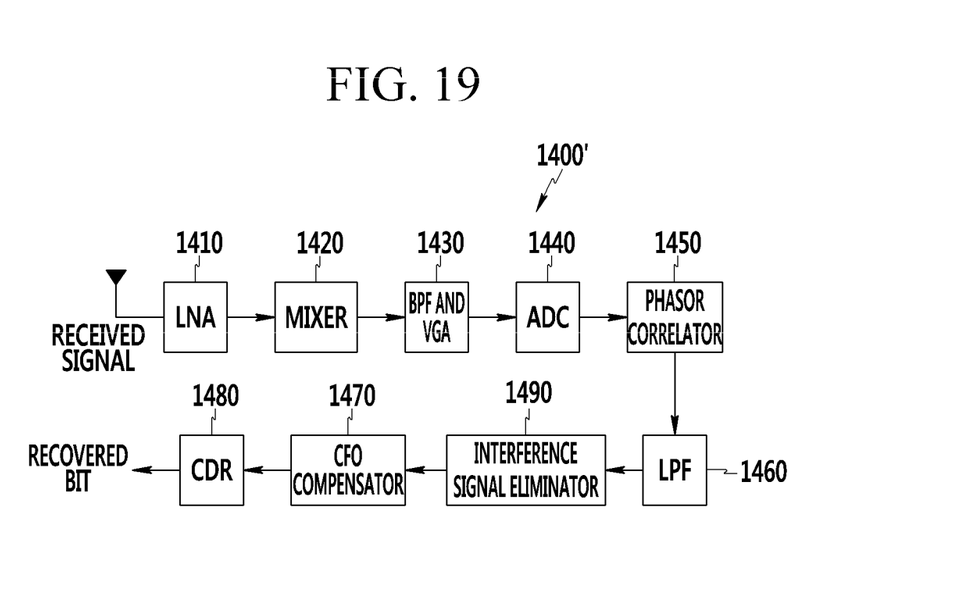
FIG. 19 is a view showing another example of the FSK receiver in accordance with the exemplary embodiment of the present invention.

FIG. 19 is a view showing another example of the FSK receiver in accordance with the exemplary embodiment of the present invention.

Referring to FIG. 19, an FSK receiver 1400' in accordance with the exemplary embodiment of the present invention may further include an interference signal eliminator 1490. Upon receiving the packet shown in FIG. 17, the interference signal eliminator 1490 may estimate the characteristics of a time-varying interference signal and eliminate the interference signal from the received signal by using the phasor output from the phasor correlator 1450 in the silence part of the packet.

According to an embodiment of the present invention, the receiving apparatus in the SUN communication system is able to achieve reliable communication quality in a poor wireless channel environment and provide various information used to facilitate SUN networking.

Furthermore, the receiving apparatus in the SUN communication system allows the use of low-cost/low-power oscillators, and makes the configuration of a low-power SUN network easy because it is able to estimate and compensate for a carrier frequency offset more efficiently than conventional FSK receivers.

The exemplary embodiments of the present invention may also be implemented by a program realizing functions corresponding to the construction of the embodiment, and a recording medium on which the program is recorded, in addition to the device and/or method described above. Such implementation may be easily made from the disclosure of the above embodiments by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of receiving signals by an FSK (frequency shift keying) receiver, the method comprising:
   receiving an FSK signal, wherein the FSK signal comprises a silence part;
   converting the FSK signal into a phasor including amplitude and phase;
   recovering a data bit from the phasor;
   eliminating an interference signal from the FSK signal by using the phasor converted from the silence part; and
   estimating a CFO (carrier frequency offset) by using the phasor.

2. The method of claim 1, further comprising, prior to the recovering, compensating for a CFO (carrier frequency offset).

3. The method of claim 2, wherein the compensating comprises estimating the CFO from the sum of phasors corresponding to predetermined parts of the FSK signal.

4. The method of claim 3, wherein the predetermined parts comprise a preamble part.

5. The method of claim 3, wherein the predetermined parts comprise an SFD (start of frame delimiter) part.

6. The method of claim 1, wherein
   the FSK signal comprises a preamble part and a payload part, and
   at least one of the preamble and payload parts comprises a silence part.

7. The method of claim 6, wherein the silence part of the preamble part is inserted after a preamble signal.

8. The method of claim 6, wherein the silence part of the payload part is inserted at regular intervals.

9. The method of claim 1, wherein the converting comprises calculating the phasor by multiplying the FSK signal by a complex conjugate of the FSK signal obtained by delaying the FSK signal by a predetermined phase difference.

10. The method of claim 1, wherein the converting comprises calculating the phasor based on a difference between the FSK signal and a signal obtained by delaying the FSK signal by a phase difference.

11. The method of claim 1, wherein the recovering comprises determining bit as 0 or 1 based on an imaginary amplitude of the phasor.

12. An apparatus for receiving an FSK (frequency shift keying) signal, the apparatus comprising:
    a phasor correlator for converting the FSK signal into a phasor including amplitude and phase, wherein the FSK signal comprises a silence part;
    a carrier frequency compensator that estimates and compensates for CFO (carrier frequency offset) by using the phasor;
    a clock and data recoverer for recovering a data bit from the phasor; and
    an interference signal eliminator that eliminates an interference signal from the FSK signal by using the phasor converted from the silence part.

13. The apparatus of claim 12, wherein
    the FSK signal comprises a preamble signal, and
    the CFO compensator estimates the CFO from sum of phasors converted from the preamble signal.

14. The apparatus of claim 12, wherein
    the FSK signal comprises an SFD (start of frame delimiter), and
    the CFO compensator estimates the CFO from the sum of phasors converted from the SFD.

15. The apparatus of claim 12, wherein
    the FSK signal comprises data, and
    the clock and data recoverer interprets a bit as 1 or 0 based on an imaginary amplitude of a phasor converted from the data in the FSK signal.

16. The apparatus of claim 12, wherein
    the FSK signal comprises a preamble part including a preamble signal and a payload part including data, and
    at least one of the preamble and payload parts comprises a silence part.

* * * * *